Jan. 28, 1958

T. T. BUNCH 2,820,987

METHODS OF AND APPARATUS FOR CONTROLLING THE
APPLICATION OF PLASTIC MATERIALS
UPON FILAMENTARY ARTICLES

Filed June 7, 1955

INVENTOR.
T. T. BUNCH
BY C.H. Nanz
ATTORNEY

Jan. 28, 1958     T. T. BUNCH     2,820,987
METHODS OF AND APPARATUS FOR CONTROLLING THE
APPLICATION OF PLASTIC MATERIALS
UPON FILAMENTARY ARTICLES
Filed June 7, 1955     3 Sheets-Sheet 2
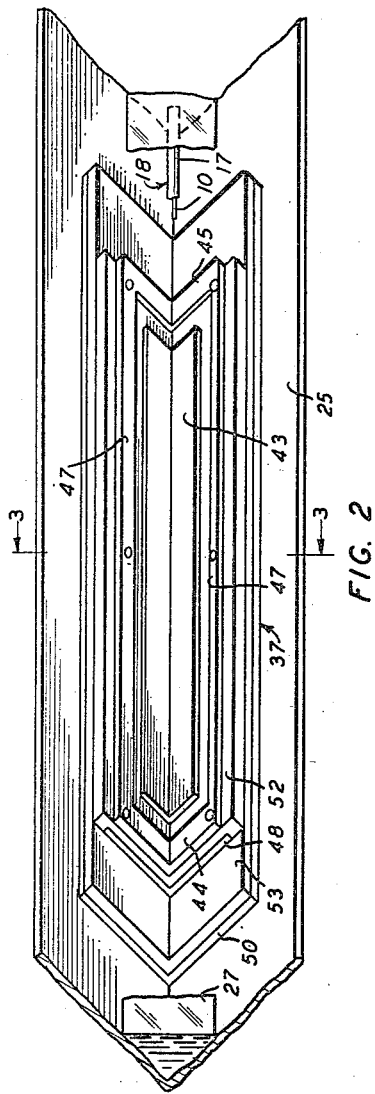
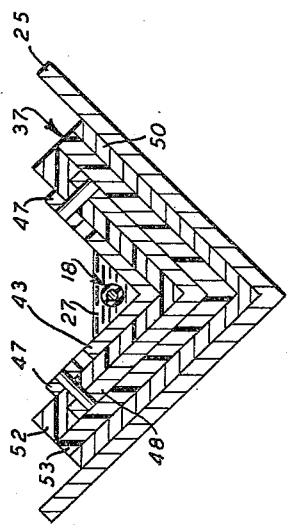
INVENTOR.
T. T. BUNCH
BY
ATTORNEY United States Patent Office 2,820,987
Patented Jan. 28, 1958

2,820,987

METHODS OF AND APPARATUS FOR CONTROLLING THE APPLICATION OF PLASTIC MATERIALS UPON FILAMENTARY ARTICLES

Tillman T. Bunch, near Ashland, Md., assignor to Western Electric Company, Incorporated, New York, N. Y., a corporation of New York Application June 7, 1955, Serial No. 513,671

10 Claims. (Cl. 18—13)

This invention relates to methods of and apparatus for controlling the application of insulating materials upon filamentary articles, and more particularly to methods of and apparatus for continuously controlling the capacitance per unit length of an insulated wire produced by applying a layer of insulating material upon one or more continuously advancing electrically conductive cores.

In the manufacture of certain types of plastic insulated conductors, the unit length capacitance of the finished insulated conductor passing an electrode is measured continuously, and the value thereof is compared with a standard capacitance of a predetermined value. The operation of an extruder applying the plastic insulation is controlled continuously to correct for deviations in the measured capacitance from the predetermined value.

The problem of providing an accurate control over the capacitance per unit length of the finished insulated conductor is complicated by the fact that the insulated conductor after emerging from the extruder must be cooled, usually in a series of relatively long water troughs, before its actual capacitance can be accurately monitored. A correct measurement of the capacitance of the insulated conductor can be obtained only after the process has stabilized the conditions of the insulated conductor so as to minimize errors due to changes in the temperature, chemical state, structure or the like.

However, because of the required interposition of the relatively long water troughs for cooling the insulated conductor, a considerable lag occurs after the time that a change in extrusion conditions producing an error occurs and before the error is detected. This time lag allows the condition which caused the change in the capacitance of the insulated conductor from the desired predetermined value to exist for a considerable length of time before a correction can be made therefor.

If the capacitance is measured immediately after the insulated conductor emerges from the extruder (i. e. before the cooling process), it is manifest that the changes in the capacitance, which occur as the insulated conductor cools to room temperature, may introduce substantial errors and severely reduce the accuracy of the control. Due to the limitation which the long cooling period places upon the reaction time of any conventional system controlling the extrusion operation, it is apparent that it would be highly desirable to reduce the delay in detecting deviations in the capacitance of the finished insulated conductor without sacrificing accuracy. It is an object of this invention to provide new and improved methods of and apparatus for controlling the application of insulating materials upon filamentary articles.

It is another object of this invention to provide new and improved methods of and apparatus for continuously controlling the capacitance per unit length of an insulated wire produced by applying a layer of insulating material upon one or more continuously advancing electrically conductive cores.

A method illustrating certain features of this invention may include the steps of continuously advancing an electrically conductive core through an applicator in which the core is enveloped in a sheath of insulating material, continuously detecting deviations in the value of a measurable physical characteristic of the sheathed core from a variable reference value, the particular physical characteristic being one of a type varying with changes in operating conditions of the applicator and affecting the capacitance per unit length of the finished sheathed core, controlling the operation of the applicator in accordance with the detected deviations so as to tend continuously to maintain the value of said characteristic substantially equal to the variable reference value, subsequently continuously detecting deviations in the value of the unit length capacitance of the finished sheathed core from a desired standard value after the value of said capacitance is suitably stable, and changing the variable reference value in accordance with said last-mentioned deviations so as to tend to maintain the capacitance per unit length of the finished sheathed core substantially constant at a predetermined value.

Apparatus illustrating certain features of this invention may include means, which are positioned adjacent an applicator designed to apply a sheath of insulating material upon an electrically conductive filamentary core, for continuously detecting deviations in the value of a measurable physical characteristic of the sheathed core from a variable reference value. The particular physical characteristic is one of a type that varies with changes in the operating conditions of the applicator and affects the capacitance of the finished sheathed core. Means responsive to the detecting means are provided for controlling the operation of the applicator in accordance with the detected deviations so as to tend continuously to maintain the value of the physical characteristic substantially equal to the variable reference value and means are positioned remotely with respect to the applicator for detecting subsequently deviations in the value of the unit length capacitance of the finished sheathed core from a desired predetermined standard value after the capacitance thereof has been suitably stabilized. Means responsive to the last-mentioned detecting means are provided for changing the variable reference value associated with the first-mentioned detecting means in accordance with the detected capacitance deviations so as to tend to maintain the capacitance per unit length of the finished sheathed core substantially constant at a desired predetermined value.

A complete understanding of this invention may be obtained from the following detailed description of a method and apparatus embodying certain features thereof when read in conjunction with the appended drawings, in which:

Fig. 2 is an enlarged, fragmentary view in perspective of a portion of a cooling trough having an electrode assembly positioned therein, the trough being viewed longitudinally from above and at an angle;

Fig. 3 is an enlarged, vertical section taken along line 3—3 of Fig. 2;

Figure 1:
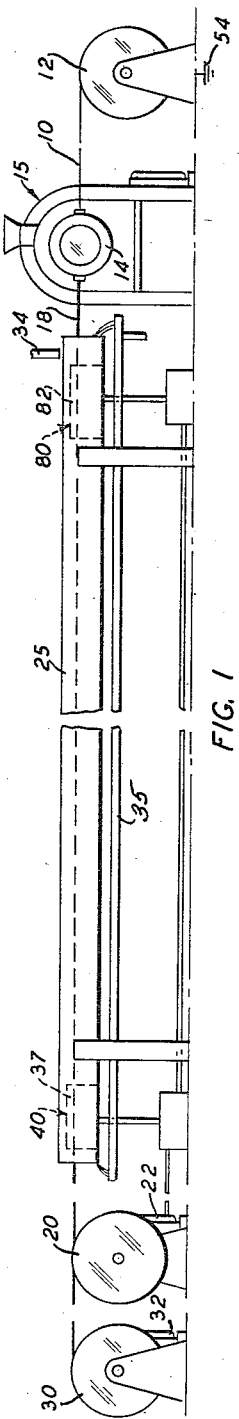
Fig. 1 is a side elevation of apparatus for extruding plastic materials, with parts thereof broken away.
Figure 5:
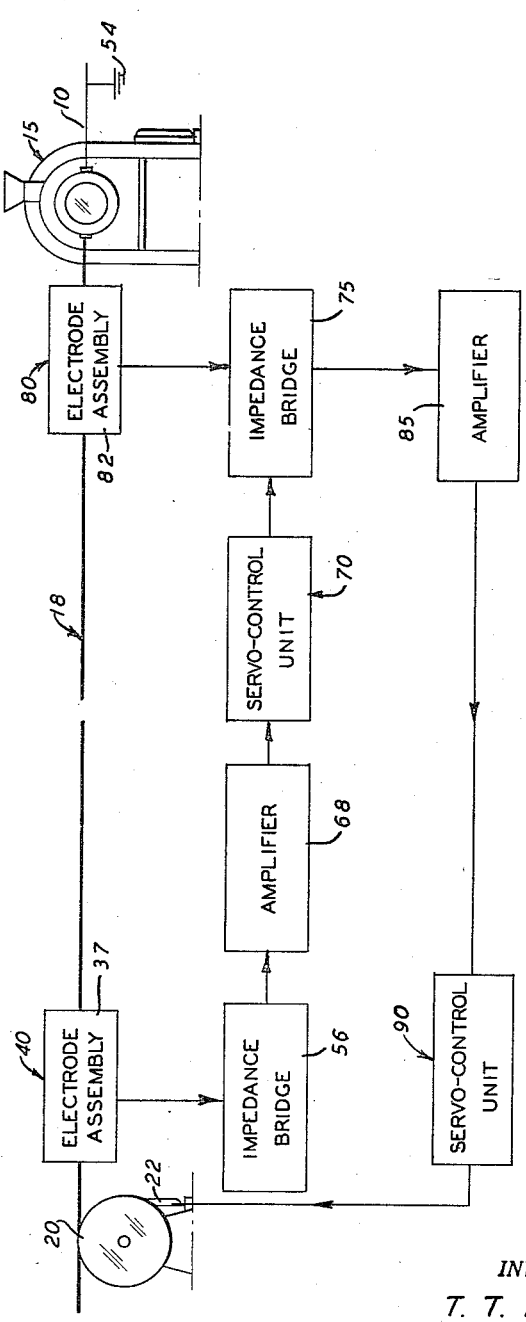
Fig. 5 is a schematic block diagram of the electromechanical control system shown in Fig. 4.

In accordance with the invention, a conductive, filamentary core 10 (Fig. 1) is advanced continuously from a supply reel 12 through an extrusion head 14 of a plastics extruder 15. The plastics extruder 15 is of a conventional type designed to apply a substantially concentric layer 17 (Fig. 2) of a plastic insulating material, such as a solid or cellular form of polyethylene, or the like, upon the core 10 to form an insulated conductor 18.

The linear speed of the core 10 advancing continuously through the extrusion head 14 is determined by a conventional take-up capstan 20 driven rotatably by an electric motor 22.

Positioned between the plastics extruder 15 and the take-up capstan 20 is an elongated, metal, V-shaped, cooling trough 25, which contains circulating water 27 (Figs. 2 and 3). The insulated conductor 18, immediately upon emerging from the extrusion head 14 enters the water 27 contained in the cooling trough 25, and remains submerged therein until immediately before it reaches the take-up capstan 20. The water 27 is supplied to the cooling trough 25 through an inlet pipe 34 at a rate sufficient to maintain the level of the water in the cooling trough substantially constant. The depth of the water 27 should be such as to insure the complete submersion of the advancing insulated conductor 18 along the entire length of the cooling trough 25. The cooling trough 25 is open at both ends thereof, and the water 27 is allowed to spill therefrom into an elongated catch basin 35 positioned immediately beneath the cooling trough 25. The insulated conductor 18 is advanced by the take-up capstan 20 to a take-up reel 30 driven by an electric motor 32 and is wound upon the take-up reel.

The cooling trough 25 is of considerable length to insure the cooling of the layer 17 of plastic insulating material to room temperature before it reaches the take-up capstan 20. In some extrusion applications, the cooling trough 25 may have a length of approximately 250 feet. Assuming that the core 10 is advanced at a linear speed of approximately 100 feet per minute, about 2½ minutes would be required for the passage of the insulated conductor 18 through a cooling trough 25 of such a length.

Positioned in the cooling trough 25 near the end thereof adjacent to the take-up capstan 20 is an electrode assembly 37 forming part of a capacitance monitoring unit 40. The capacitance monitoring unit 40 is designed to monitor continuously the capacitance between the centrally disposed core 10 of the continuously advancing, insulated conductor 18 and a conductive sheath formed by the water 27 in the cooling trough 25 surrounding the periphery of a predetermined length of the insulated conductor 18 taken progressively therealong. The water 27 in the cooling trough 25 is preferably ordinary tap water, which is sufficiently conductive to permit such capacitance measurements to be made.

A capacitance monitoring unit particularly well suited for such capacitance measurements is disclosed fully and claimed in a copending application Serial No. 378,330, filed September 3, 1953, by M. C. Biskeborn, now Patent 2,804,592, issued August 27, 1957. This particular capacitance monitoring unit has been chosen merely as an example to facilitate the description of this invention, and certain parts thereof will be described only to the extent necessary for a complete understanding of the present invention.

As shown in Figs. 2 and 3, the electrode assembly 37 rests on the angular sides of the metal cooling trough 25. The submerged insulated conductor 18 moves longitudinally through the electrode assembly 37 passing between the sides of an open-ended, trough-shaped metal electrode 43 and a pair of open-ended, trough-shaped, metal end guards 44 and 45, positioned at opposite ends of the electrode. The electrode 43 and the end guards 44 and 45, which are joined together by longitudinally extending guard strips 47—47 formed integrally therewith, are nested within an elongated, trough-shaped, metal guard member 48. The guard member 48 is in turn nested within a metal shield 50 having a similar configuration. The electrode 43 is separated from the guard member 48 by means of a layer 52 of insulating material, such as sheet polyethylene or the like. Similarly, the guard member 48, which is connected electrically to the end guards 45 and 46, is separated from the shield 50 by an interposed layer 53 of like insulating material. The conductive core 10 is connected to ground by means of a suitable connection, such as the grounding connection indicated schematically at 54 in Fig. 1.

Figure 4:
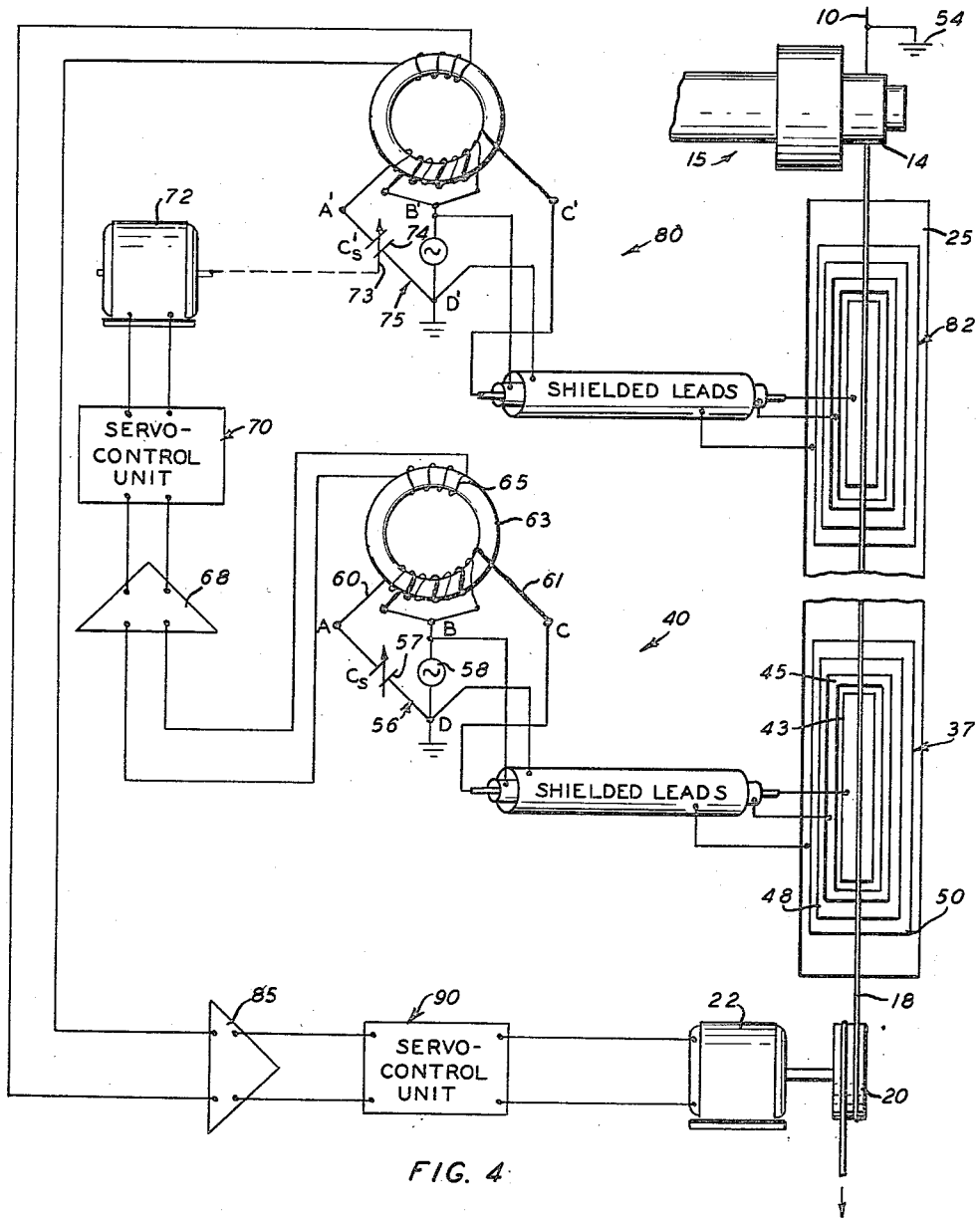
Fig. 4 is a schematic representation of an electromechanical control system forming part of the apparatus.

Referring now to Fig. 4, there is shown schematically an electrical circuit forming part of the capacitance monitoring unit 40. The circuit includes a sensitive impedance bridge 56 having four terminals, designated A, B, C and D. One arm AD of the bridge 56 contains a manually adjustable, standard capacitor 57 having a capacitance $C_s$. The adjacent arm CD of the bridge 56 is connected at the terminal C to the electrode 43 and at the other terminal D to ground. The bridge 56 is energized by a low frequency oscillator 58 operated at 10 kc. and connected across the terminals B and D.

The arms AB and BC of the impedance bridge 56 include low impedance windings 60 and 61, which are bifilarly wound upon a common toroidal core 63. The end guards 44 and 45 and the guard member 48 are connected to the terminal B of the bridge 56, and are maintained at substantially the same vector potential as the electrode 43, which is connected to the terminal C of the bridge. The end guards 44 and 45 and the guard member 48 effectively isolate the column of water contained in the trough-shaped electrode 43 from the remainder of the water 27 in the cooling trough 25, and effectively eliminate fringing effects at the ends of the electrode to insure that the measured capacitance applies only to a length of insulated conductor adjacent to and substantially equal in length to the electrode plus one-half of the sum of the lengths of the gaps between the electrode 43 and the end guards 44 and 45, respectively. The high admittance to ground through the water column at the ends of the electrode 43 and stray capacitance between the electrode and the grounded shield 50 are thereby eliminated from affecting the balance of the bridge 56.

The water column within the electrode 43 and surrounding the insulated conductor 18 provides a high admittance path between the electrode and the water sheath surrounding the outer periphery of the layer 17 of plastic insulating material, such that the capacitance between the electrode and ground may be considered to be comprised entirely of the distributed capacitance $C_x$ of a predetermined length of the grounded insulated conductor approximately equal to the length of the electrode, as given by the equation:

$$C_x = \frac{K\epsilon}{\log \frac{D}{d}}$$

wherein:

$C_x$ = capacitance of the predetermined length of insulated conductor 18

$D$ = diameter over the layer 17 of plastic insulating material $d$ = the diameter of the conductive core 10

$\epsilon$ = composite dielectric constant of the plastic insulating material $K$ = constant, depending on units used, e. g. $K = 7.366$ if $C_x$ is in $\mu\mu f./ft.$ The impedance bridge 56 of the capacitance monitoring unit 40 continuously compares the capacitance $C_x$ with the standard capacitance $C_s$ which is preset at a desired predetermined value. The output signal from a detector coil 65 which is wound on the toroidal core 63 varies in phase and in magnitude with the direction and magnitude of the deviation in the capacitance $C_x$ from the standard capacitance $C_s$. Since the conductance is negligible, the phase angle of the output signal of the detector coil 65 is essentially either 0° or 180°. This output signal is amplified by an amplifier 68 and fed to a suitable servo control unit, indicated schematically at 70 in Fig. 4.

The servo control unit 70 is designed to operate a servomotor 72 (Fig. 4) which is coupled mechanically to a rotor 73 of an adjustable capacitor 74 having a variable reference capacitance $C_s'$. The operation of the servomotor 72 effects the movement of the rotor 73 of the capacitor 74 to adjust its setting and the value of the variable reference capacitance $C_s'$. The variable reference $C_s'$ forms one arm A'D' of an impedance bridge 75 having four terminals designated A', B', C' and D'. The impedance bridge 75 forms a part of a capacitance monitoring unit 80 which is substantially identical in design to the capacitance monitoring unit 40 and is similarly provided with an electrode assembly 82 similar to the electrode assembly 37.

The electrode assembly 82 is positioned in the cooling trough 25 near the end thereof adjacent to the extrusion head 14 of the plastics extruder 15. The submerged insulated conductor 18 continuously advances longitudinally through the electrode assembly 82 almost immediately after emerging from the extrusion head 14 and the capacitance monitoring unit 80 is designed similarly to monitor continuously the capacitance $C_x'$ between the centrally disposed core 10 and the substantially concentric conductive sheath formed by the water 27 in the cooling trough 25 surrounding the periphery of a predetermined length of the insulated conductor taken progressively therealong.

The capacitance $C_x'$, which will be referred to hereinafter as the initial capacitance to distinguish it from the final capacitance $C_x$ of the finished insulated conductor, is compared continuously by the impedance bridge 75 with the variable reference capacitance $C_s'$. The output signal from the capacitance monitoring unit 80 varies in phase and in magnitude with the direction and magnitude of a deviation in the initial capacitance $C_x'$ from the instantaneous value of variable reference capacitance $C_s'$ and this output signal is fed to an amplifier 85 and thence to a suitable servo control unit indicated schematically at 90. The servo control unit 90 is designed to control the speed of the electric drive motor 22, which drives the take-up capstan 20 advancing the core 10 through the plastic extruder 15, and thus the linear speed at which the core advances through the extrusion head 14 of the extruder 15. A suitable system for controlling the linear speed of the core 10 is disclosed and claimed in a copending application Serial No. 378,243 filed September 3, 1953 by R. D. Gambrill now Patent No. 2,765,441, issued October 2, 1956.

Manifestly, variations in the speed of the core 10 through the extrusion head 14 will result in corresponding changes in the outer diameter of the layer 17 of plastic insulating material surrounding the core. That is, when the linear speed of the core 10 decreases, the outer diameter of the layer 17 increases, and vice versa. Referring again to the formula set out above for the capacitance of a unit length of the insulated conductor, it is apparent that a proper reduction in the outer diameter of the layer 17 will serve to compensate for a decrease in the dielectric constant of the plastic insulating material.

The servo control unit 90 is designed to have a relatively fast response, preferably an instantaneous response, to a detected deviation between the value of the variable reference capacitance $C_s'$ and the initial capacitance $C_x'$ of insulated conductor 18 sensed by the monitoring unit 80 shortly after the insulated conductor emerges from the plastics extruder. Thus, the servo control unit 90 provides a relatively rapid correction for such detected deviations by immediately initiating an appropriate change in the linear speed of the core 10 so as to tend to restore a balanced condition to the impedance bridge 75.

In contrast, the servo control unit 70 is designed to respond more slowly to detected deviations between the standard capacitance $C_s$ and the final capacitance $C_x$ of the finished insulated conductor 18, which has cooled to a stable temperature, as sensed by the monitoring unit 40. For example, the servo control unit 70 may function as an integrator and provide an output signal proportional to the time accumulation of the error. As a result, the corrections made by the servomotor 70 in the setting of the adjustable capacitor 74 will be effectively the result of relatively long-time information and will be proportional to the average deviation between the standard capacitance $C_s$ and the final capacitance $C_x$ of the finished insulated conductor over a predetermined time interval.

*Operation*

To illustrate the application of the invention to an extrusion process, it will be assumed that it is desired to extrude upon a bare, filamentary, copper core 10, a layer 17 of expanded cellular polyethylene. As a preliminary consideration, the plastics extruder 15 utilized to produce the insulated conductor 18 would be designed to extrude a substantially concentric layer 17 of expanded, cellular polyethylene.

It will be assumed further that temperature, pressure and compound conditions are established so that the gas content of the expanded cellular polyethylene is maintained wihin a normal range of fluctuations. It will be understood that during an extrusion operation, fluctuations in the gas content will occur due to reasons beyond the control of an operator. For example, the gas content even under the most ideal conditions may fluctuate within a normal range of $\pm 5\%$ about a desired value. The result is that during the extrusion operation, these fluctuations in the gas content and their effect on the composite dielectric constant $\epsilon$ of the expanded cellular polyethylene forming the insulating layer 17 cause corresponding changes in the capacitance per unit length of the finished insulated conductor. However, in accordance with this invention, corrections are made automatically for these fluctuations in the gas content of the expanded cellular polyethylene so as to tend to maintain the capacitance per unit length of the finished insulated conductor 18 substantially constant at the desired predetermined value.

Preparatory to the extrusion operation, the standard capacitor 57 is manually adjusted to establish a desired predetermined value $C_s$ which determines the desired predetermined capacitance per unit length of the finished insulator conductor 18. During the extrusion operation, the core 10 is advanced continuously through the extrusion head 14 of the plastics extruder 15 by the take-up capstan 20. In the extrusion head 14, the layer 17 of expanded, cellular polyethylene is applied continuously to the core 10 to form the insulated conductor 18 which shortly after emerging from the extrusion head is emersed in the water 27 contained in the cooling trough 25. After entering water 27 in the cooling trough 25 the insulated conductor 18 passes immediately through the electrode assembly 82 associated with the capicitance monitoring unit 80. Thereafter the insulated conductor 18 traverses the length of the cooling trough 25 and finally passes through the electrode assembly 37 associated with the capacitance monitoring unit 40. As mentioned previously, the insulated conductor 18 has cooled sufficiently to stabilize its temperature before it passes through the electrode assembly 37 so that the capacitance sensed by the capacitance monitoring unit 40 is for all purposes the actual capacitance of the finished insulated conductor 18.

It will be assumed now that the extrusion operation has proceeded long enough to establish normal operating conditions. The capacitance monitoring unit 40 will continuously sense the capacitance $C_x$ of a predetermined length of the finished insulated conductor 18 taken progressively along the conductor and continuously compare this capacitance $C_x$ with the standard capacitance $C_s$. Any difference between the capacitances $C_x$ and $C_s$ gives rise to an error signal proportional to the deviation, which is fed to the servo control unit 70. As described previously, the servo control unit 70 transmits an output signal proportional to the time accumulation of the output error signal of the capacitance monitoring unit 40. The output signal from the servo control unit 70 operates the servomotor 72 accordingly to adjust the setting of the capacitor 74 so as to establish a capacitance $C_s'$ which is effectively an instantaneous control point which will tend to insure the production of a finished insulated conductor having an overage capacitance per unit length of the desired value.

The capacitance monitoring unit 80 meanwhile will sense continuously the initial capacitance $C_x'$ of a predetermined length of the insulated conductor 18 taken along the length of the conductor, shortly after the conductor emerges from the extrusion head 14. The initial capacitance $C_x'$ will be compared continuously with the instantaneous value $C_s'$ of the capacitor 74 and a deviation therebetween will result immediately in an unbalance of the impedance bridge 75 whereupon the servo unit 90 will react instantaneously to cause a change in the speed of the take-up capstan 20, and, thus, a change in the speed of the core 10, by an amount and in a direction such as to restore the match between capacitance $C_x'$ and the capacitance $C_s'$. Manifestly, it is apparent that the changes in the capacitance of the insulated conductor 18, due to fluctuations in the gas content of the expanded cellular polyethylene layer 17 will be immediately detected by the capacitance monitoring unit 80 and the instantaneous response of servo control unit 90 will rapidly effect a change in the linear speed of the core 10 in such a manner as to tend to correct therefor.

The cooperation between the capacitance monitoring units 40 and 80, achieves a solution to the problem of continuously controlling the extrusion operation to obtain a finished insulated conductor having a substantially uniform capacitance per unit length of a predetermined value. The invention makes it possible to immediately correct for fluctuations in extrusion conditions, which cause changes in the capacitance of the insulated conductor 18, without sacrificing the accuracy of the control over the capacitance of the finished product.

It will be understood that the above-described method and apparatus are merely illustrative of the principles of the invention. Manifestly, various modifications thereof may be made within the spirit and scope of the invention. For example, it is obvious that corrections in the unit length capacitance of the finished insulated conductor may be made other than by controlling the linear speed of the core. It is possible to effect desired changes in the unit length capacitance of the finished insulated conductor by suitably adjusting such operating conditions as the extrusion pressure, the extrusion temperature, or the like, by various means known in the art.

It will be understood further that, although expanded cellular polyethylene has been described hereinabove by way of example, this invention is useful in the application of other types of plastic insulating materials, such as polyvinyl chloride, copolymers of vinyl chloride and vinyl acetate, plasticized polystyrene, cellulose acetate, rubber or rubber-like compounds, or the like, whether in solid or cellular form, as well as other insulating materials, such as varnishes, lacquers, and the like.

What is claimed is:

1. The method of controlling the application of insulating materials to filamentary articles, which comprises the steps of continuously advancing an electrically conductive core through an applicator in which the core is enveloped in a sheath of insulating material, continuously detecting deviations in the value of a measurable physical characteristic of the sheathed core immediately after it passes from the applicator from a variable reference value, the particular physical characteristic being one of a type varying with changes in operating conditions of the applicator and affecting the capacitance per unit length of the finished sheathed core, controlling the operation of the applicator in accordance with the detected deviations so as to tend continuously to maintain the value of said characteristic substantially equal to the variable reference value, continuously detecting subsequently deviations in the value of the unit length capacitance of the finished sheathed core from a desired standard value after the value of said capacitance has been suitably stabilized, and changing the variable reference value in accordance with said last-mentioned deviations so as to tend to maintain the capacitance per unit length of the finished sheathed core substantially constant at a predetermined value.

2. The method of controlling the extrusion of plastic materials, which comprises the steps of continuously advancing an electrically conductive core through an extruder in which the core is enveloped in an extruded sheath of plastic insulating material, continuously detecting deviations in the value of a measurable physical characteristic of the sheathed core immediately after it emerges from the extruder from a variable reference value, the particular physical characteristic being one of a type varying with changes in extruder operating conditions and affecting the capacitance per unit length of the finished sheathed core, rapidly effecting changes in the operation of the extruder in accordance with the detected deviations so as to tend continuously to correct for such deviations to maintain the value of said characteristic substantially equal to the variable reference value, subsequently continuously detecting deviations in the unit length capacitance of the finished sheathed core from a desired standard value after the value of said capacitance has been suitably stabilized, and changing the variable reference value in accordance with the average of said last-mentioned deviations over a predetermined time interval so as to maintain the capacitance per unit length of the finished sheathed core substantially constant at a predetermined value.

3. The method of controlling the extrusion of plastic material, which comprises the steps of continuously advancing an electrically conductive core through an extruder in which the core is enveloped in an extruded sheath of plastic insulating material, continuously sensing the value of the unit length capacitance of the sheathed core soon after it emerges from the extruder and detecting deviations in this value from a variable reference value, controlling the operation of the extruder in accordance with the detected deviations so as to tend continuously to correct for such deviations to maintain the value of said capacitance substantially equal to the variable reference value, subsequently continuously sensing the unit length capacitance of the finished sheathed core after the value of the unit length capacitance thereof has been suitably stabilized and detecting deviations in the value of said stabilized capacitance from a desired standard value, and changing the variable reference value in accordance with the average of said last-mentioned deviations over a predetermined time interval so as to maintain the capacitance per unit length of the finished sheathed core substantially constant at a predetermined value.

4. The method of controlling the extrusion of plastic materials, which comprises the steps of continuously advancing an electrically conductive core through an extruder in which the core is enveloped in an extruded sheath of plastic insulating material, continuously sensing the value of the unit length capacitance of the sheathed core soon after it emerges from the extruder and detecting deviations in this value from a variable reference value, rapidly effecting a change in the operation of the extruder in accordance with the detected deviations so as to tend continuously to correct for such deviations to maintain the value of said capacitance substantially equal to the variable reference value, subsequently continuously sensing the unit length capacitance of the finshed sheathed core after the unit length capacitance thereof has been suitably stabilized and detecting deviations in the value of said last-mentioned capacitance from a desired standard value, and changing the variable reference value in accordance with the average of said last-mentioned deviations over a predetermined time interval so as to maintain the capacitance per unit length of the finished sheathed core substantially constant at a predetermined value.

5. The method of controlling the extrusion of plastic materials, which comprises the steps of continuously advancing an electrically conductive core through an extruder in which the core is enveloped in an extruded sheath of plastic insulating material, continuously sensing the value of the unit length capacitance of the sheathed core immediately after it emerges from the extruder and detecting deviations in this value from a variable reference value, changing the linear speed of the core advancing through the extruder in accordance with the detected deviations to cause corresponding changes in the outer diameter of the sheath so as to tend continuously to correct for such deviations to maintain the value of said capacitance substantially equal to the variable reference value, subsequently continuously sensing the unit length capacitance of the finished sheathed core after the capacitance thereof has been suitably stabilized and detecting deviations in the value of said stabilized capacitance from a desired standard value, and changing the variable reference value in accordance with the average of said last-mentioned deviations over a predetermined time interval so as to maintain the capacitance per unit length of the finished sheathed core substantially constant at a predetermined value.

6. In apparatus for applying insulating materials including an applicator for applying a sheath of insulating material upon an electrically conductive filamentary core and means for advancing the core continuously through the applicator, the improvement which comprises means positioned adjacent to the applicator for continuously detecting deviations in the value of a measurable physical characteristic of the sheathed core from a variable reference value, the particular physical characteristic being one of a type that varies with changes in operating conditions of the applicator and affects the capacitance of the finished sheathed core, means responsive to said detecting means for controlling the operation of the applicator in accordance with the detected deviations so as to tend continuously to maintain the value of said characteristic substantially equal to the variable reference value, means positioned remotely with respect to the applicator for detecting subsequently deviations in the unit length capacitance of the finished sheathed core from a desired predetermined standard value after the capacitance thereof has been suitably stabilized, and means responsive to said last-mentioned detecting means for changing the variable reference value associated with the first-mentioned detecting means in accordance with detected capacitance deviations so as to tend to maintain the capacitance per unit length of the finished sheathed core substantially constant at a desired predetermined value.

7. In apparatus for extruding plastic materials including an extruder for applying a sheath of plastic insulating material upon an electrically conductive filamentary core and means for advancing the core continuously through the extruder, the improvement which comprises means positioned adjacent to the extruder for continuously detecting deviations in the value of a measurable physical characteristic of the sheathed core from a variable reference value soon after it emerges from the extruder, the particular physical characteristic being one of a type that varies with changes in extruder operating conditions and affects the capacitance of the finshed sheathed core, means responsive to said detecting means for controlling the operation of the extruder to effect rapid changes therein in response to and in accordance with the detected deviations so as to tend continuously to maintain the value of said characteristic substantially equal to the variable reference value, means positioned remotely with respect to the extruder for detecting subsequently deviations in the unit length capacitance of the sheathed core from a desired predetermined standard value after the capacitance has been suitably stabilized, and means responsive to said last-mentioned detecting means for changing the variable reference value associated with the first-mentioned detecting means in accordance with the average of the detected capacitance deviations over a predetermined time interval so as to tend to maintain the capacitance per unit length of the finished sheathed core substantially constant at a desired predetermined value.

8. In apparatus for extruding plastic materials including an extruder for applying a sheath of plastic insulating material upon an electrically conductive filamentary core and means for advancing the core continuously through the extruder, the improvement which comprises means positioned adjacent to the extruder for detecting continuously deviations in the unit length capacitance of the sheathed core from a variable reference value soon after it emerges from the extruder, means responsive to said detecting means for controlling the operation of the extruder in accordance with the detected deviations so as to tend continuously to maintain the value of said capacitance substantially equal to the variable reference value, a second means positioned remotely with respect to the extruder for detecting subsequently deviations in the unit length capacitance of the sheathed core from a desired predetermined standard value after the capacitance has been suitably stabilized, and means responsive to the second detecting means for changing the variable reference value associated with the first detecting means in accordance with the average of said last-mentioned deviations over a predetermined time interval so as to tend to maintain the capacitance per unit length of the finshed sheathed core substantially constant at a desired predetermined value.

9. In apparatus for extruding plastic materials including an extruder for applying a sheath of plastic insulating material upon an electrically conductive filamentary core, means for advancing the core continuously through the extruder and an elongated water trough through which the sheathed core is advanced for the purpose of stabilizing its properties, the improvement which comprises means positioned adjacent to the extruder for sensing continuously the unit length capacitance of the sheathed core immediately after it emerges from the plastics extruder and for detecting deviations in the value of said capacitance from a variable reference value, means responsive to said sensing and detecting means for controlling the operation of the extruder to effect rapid changes therein in response to and in accordance with the detected deviations so as to tend continuously to maintain the value of said capacitance substantially equal to the variable reference value, a second means positioned near the remote end of the water trough with respect to the extruder for sensing the unit length capacitance of the sheathed core after its value has been stabilized by the cooling process and for detecting deviations in the value of the last mentioned unit length capacitance from a desired predetermined standard value, and means responsive to the second sensing and detecting means for changing the variable reference value associated with the first sensing and detecting means in accordance with the average of the last-mentioned deviations over a predetermined time interval so as to tend to maintain the capacitance per unit length of the finished sheathed core substantially constant at a desired predetermined value.

10. In apparatus for extruding plastic materials including an extruder for applying a sheath of plastic insulating material upon an electrically conductive filamentary core, means for advancing the core continuously through the extruder and an elongated cooling trough through which the sheathed core is advanced after emerging from the extruder to stabilize its temperature, the improvement which comprises a capacitance monitor positioned adjacent to the extruder for sensing continuously the unit length capacitance of the sheathed core immediately after it emerges from the extruder and for detecting deviations in the value of said capacitance from a variable reference value, means responsive to said monitoring means for controlling the core advancing means to change rapidly the linear speed at which the core advances through the extruder in accordance with the detected deviations so as to tend continuously to maintain the value of said capacitance substantially equal to the variable reference value, a second capacitance monitor positioned near the remote end of the water trough with respect to the extruder for sensing the unit length capacitance of the finished sheathed core after it has been cooled sufficiently to stabilize its temperature and for detecting deviations in the value of the last-mentioned capacitance from a desired predetermined standard value, and means responsive to the second capacitance monitor for changing the variable reference value of the first capacitance monitor in accordance with the average of the last-mentioned deviations over a predetermined time interval so as to tend to maintain the capacitance per unit length of the finished sheathed core substantially constant at a desired predetermined value.

References Cited in the file of this patent
UNITED STATES PATENTS

| | | |
|---|---|---|
| 2,369,858 | Ryan | Feb. 20, 1945 |
| 2,372,162 | Ryan | Mar. 20, 1945 |
| 2,540,146 | Stober | Feb. 6, 1951 |
| 2,588,882 | Rolfson | Mar. 11, 1952 |
| 2,665,409 | Rogers | Jan. 5, 1954 |
| 2,726,922 | Merrill et al. | Dec. 13, 1955 |